(No Model.) 3 Sheets—Sheet 1.
W. R. FOX.
MITER CUTTING MACHINE.
No. 433,781. Patented Aug. 5, 1890.
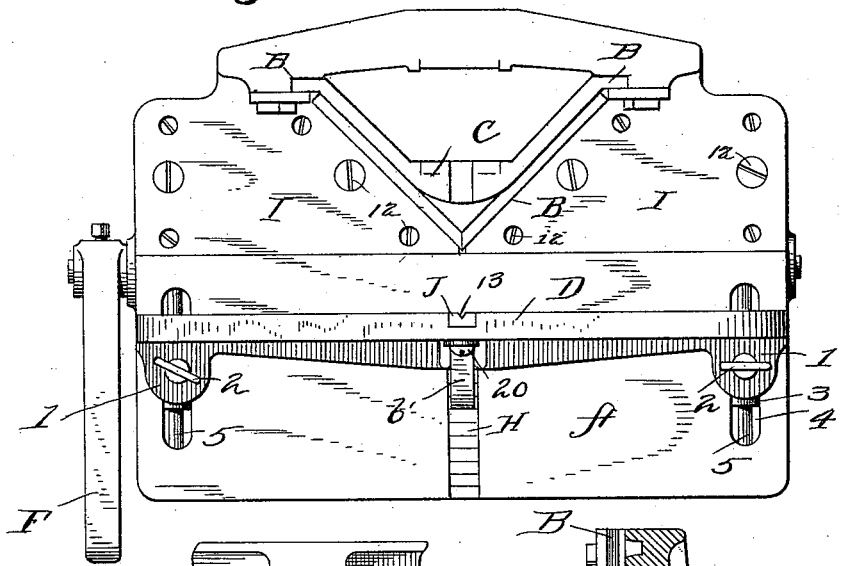
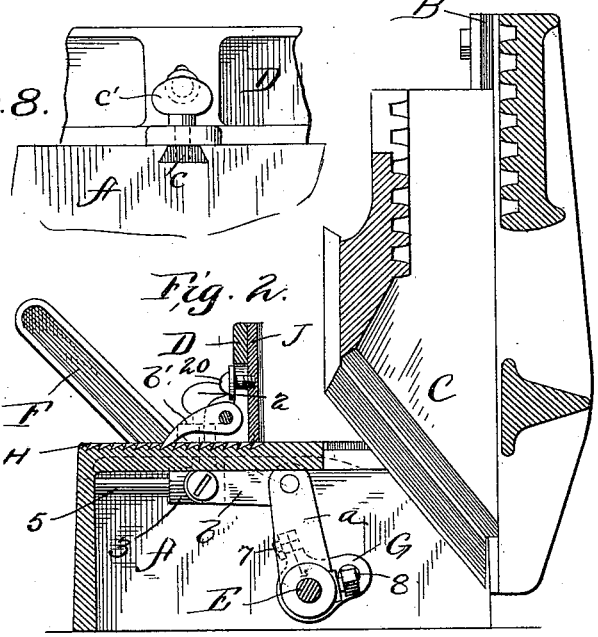
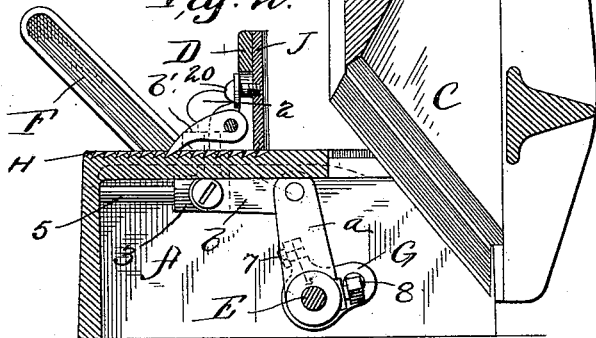
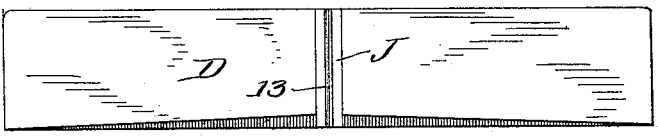
Witnesses
Walter P. Keene.
Walter Donaldson
Inventor
Wm. R. Fox.
By Ellis Spear
Atty.

(No Model.) 3 Sheets—Sheet 2.
W. R. FOX.
MITER CUTTING MACHINE.
No. 433,781. Patented Aug. 5, 1890.
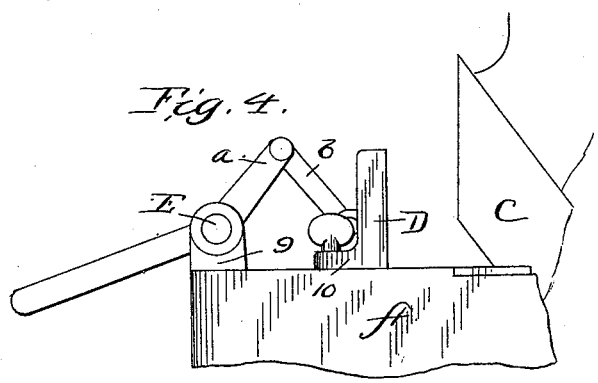
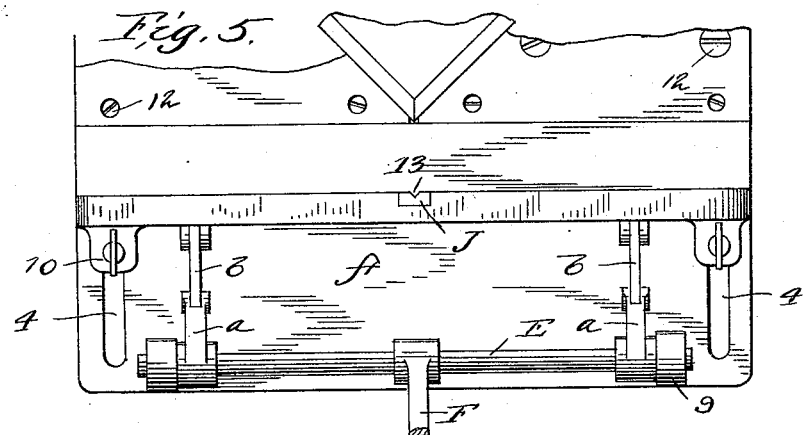
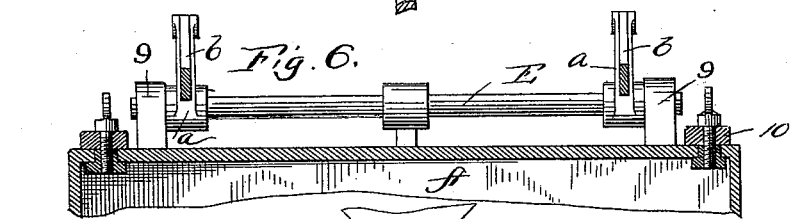
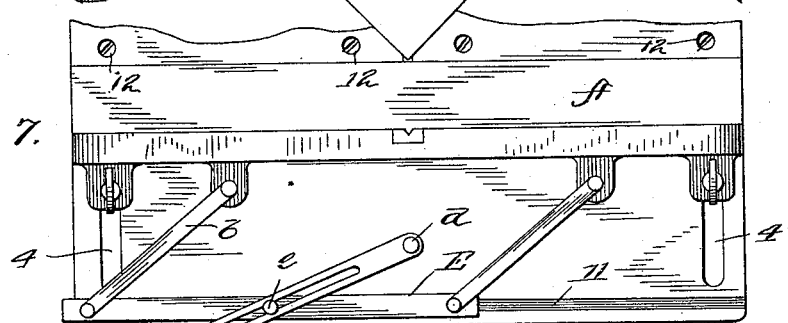
Witnesses
Walter P. Keene.
Walter Donaldson
Inventor
William R. Fox.
by Ellis Spear
Atty.

(No Model.) 3 Sheets—Sheet 3.

W. R. FOX.
MITER CUTTING MACHINE.

No. 433,781. Patented Aug. 5, 1890.

Witnesses
F. L. Middleton
James McTear

Inventor
William R. Fox,
by Ellis Spear
Atty.

UNITED STATES PATENT OFFICE.

WILLIAM R. FOX, OF GRAND RAPIDS, MICHIGAN.

MITER-CUTTING MACHINE.

SPECIFICATION forming part of Letters Patent No. 433,781, dated August 5, 1890.

Application filed February 19, 1890. Serial No. 341,060. (No model.)

*To all whom it may concern:*

Be it known that I, WILLIAM R. FOX, of Grand Rapids, in the county of Kent and State of Michigan, have invented a new and useful Improvement in Miter-Cutting Machines; and I do hereby declare that the following is a full, clear, and exact description of the same.

My invention relates particularly to the construction of the adjustable gage and the means for operating it, the object in the first instance being to adapt the gage to a machine in which vertically-adjustable bed-pieces are used, as well as to other machines, and in the latter case the object is to secure stability and accuracy in adjustment.

Figure 9:
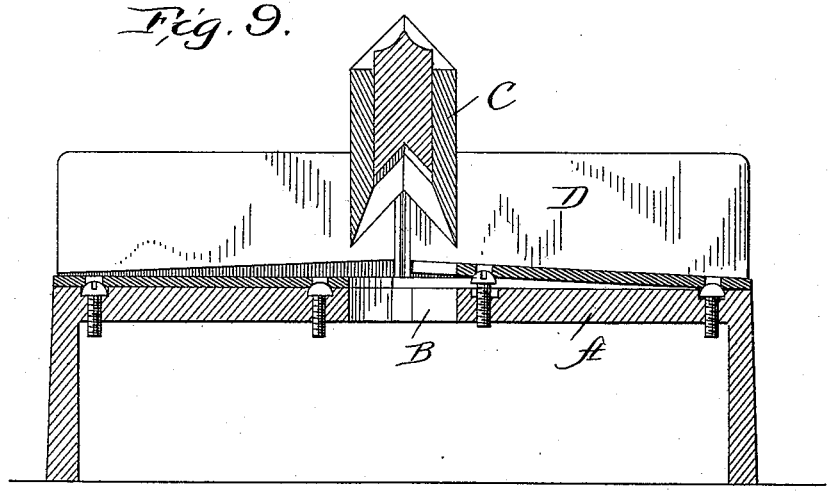
Figure 10:
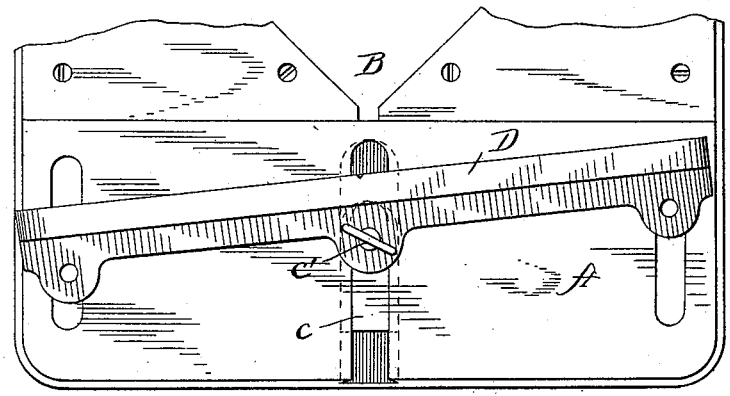
Figure 11:
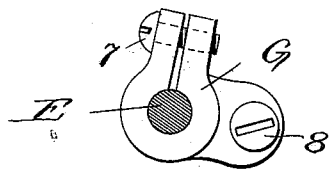

In the accompanying drawings, Figure 1 is a plan view; Fig. 2, a vertical section; Fig. 3, a view of the gage detached. Fig. 4 is a side elevation of modified means for adjusting the gage. Fig. 5 is a plan, and Fig. 6 an end view, of the same, partly in section. Fig. 7 is a plan of another modification. Fig. 8 is a detail of a modified manner of adjusting and holding the gage. Fig. 9 is a sectional detail view of the adjustable bed-plates, showing them in their relation to the gage. Fig. 10 is a detail view showing the gage as locked in an inclined position with the locking device of Fig. 8. Fig. 11 is a detail view of the friction device applied to the operating-bar E shown in position in Fig. 2.

In the drawings, A is the bed of the machine, having guideways B, in which the cutting-knives C are moved in any suitable way.

The gage D, which regulates the position of the material relatively to the knife, extends across the bed, and at each end is connected with the adjusting mechanism, thus insuring accuracy of movement and stability. Each end has a lug 1 formed thereon, through which pass thumb-screws 2, which enter blocks 3, arranged to slide in slots 4 of the bed and supported by rods 5 beneath the bed. A movable bar E extends beneath the bed and is combined with a handle F for operating it, the imparted movement in this instance being a rotary one, so that the bar E is rocked when the handle is operated. Connection from this movable bar is made to the sliding blocks by means of arms $a$, fixed on the bar E, and the links $b$, pivoted to the sliding blocks. By turning the handle the movement is communicated to both ends of the gage certainly and equally.

In order to place the movable bar E under frictional restraint to aid in holding the gage, a friction-block G is employed, which embraces the bar, and is adjusted by means of a set-screw 7, Figs. 2 and 11. The block is held to the bed by a screw 8.

In the bed, parallel with the line of movement of the gage, is formed a series of rack-teeth H. A pawl $b'$, pivoted on the gage, is adapted to these teeth and constitutes an automatic grip or lock, which holds the gage in any position to which it has been moved. Instead of this form of lock, the gage may have a beveled block $c$ formed therewith, adapted to the groove and held by an adjusting-screw $c'$. It will be understood that one or more of these racks and pawls may be used with a gage, and they may be arranged at or near the ends. In Figs. 4, 5, and 6 is shown a modified arrangement of this adjusting mechanism, in which the movable bar E is supported in bearings above the bed instead of beneath. The connection here is more direct, consisting only of the arms $a$ and links $b$, pivoted in ears 9 on the gage. In this instance also the power is applied near the ends of the gage and the movement is guided by the slots 4, which receive holding-down projections 10 on the gage. In Fig. 7 the gage is similarly guided at its ends in the slots 4 4 of the bed. The movable bar E in this instance has linear reciprocating movement instead of rotary, it being arranged to slide longitudinally in a groove 11. The operating-lever is pivoted at $d$ to the bed and at $e$ to the bar. The bar is connected to the gage by the links $b$, and it will be seen that movement of the bar lengthwise will cause the links to properly move the gage.

In order to secure desired effects in the cutting of the work, the parts of the bed adjacent to the knife are composed of adjustable sections I, held by screws 12 to the bed proper, so that the inner ends of said sections may be elevated to properly present the work to the knife, Figs. 1 and 9. A vertical groove 13 is provided in the front face of the gage, which, when said gage is adjusted to its extreme forward position, receives the side of the knife, so that the knife will when the gage is in this position cut entirely across the material and sever it. In this position also the gage overlaps the adjustable sections of the bed, and special provision is necessary to allow the adjustment of the said sections. For this purpose the lower edge of the gage is cut away, preferably on an incline from near or at its ends to the center of the gage, as in Fig. 3, the incline being upward from end to center, so that the inner ends of the adjustable bed-sections may be elevated without obstruction from the gage, the ends of the gage being left intact from top to bottom to provide a proper bearing for the work.

In order to furnish a bearing for the work on the gage at the cutting-point, a piece J is inserted in the gage, which contains the guiding-groove 13, the said piece extending from the top clear to the bottom of the gage across the cut-away part. This causes the knife to make a clear cut by affording a bearing for the work immediately about the vertical groove, thus preventing spreading or splitting of the work. The inserted piece is adjusted vertically when the bed-plates are adjusted, said piece being held in any position by a screw 20 passing through a slot in the gage. The same result may be obtained by leaving the central portion of the gage intact instead of cutting it away; but I prefer to employ the inserted piece.

By the manner of adjusting the gage shown in Figs. 8 and 10 the machine may be used for cutting bevels by disconnecting the gage at the ends and swinging the same into any adjusted position to be held by the set-screw.

I claim as my invention—

1. In combination, the bed and knife, a movable bar E with an operating-lever, a gage and a link between the movable bar and the gage, said link being in pivotal connection with each, substantially as described.

2. In combination, the slotted bed and knife, the gage, the rods 5 below the bed, the sliding blocks on said rods, the movable bar E with arms *a* connected to said blocks by pivoted links *b*, and the thumb-screws on the gage engaging with the sliding blocks, substantially as described.

3. In combination, the bed and knife, the gage, the movable bar E connected thereto, and the frictional block G, acting on the bar E, for placing the parts under frictional restraint, substantially as described.

4. In combination, the knife and bed, the adjustable gage, the operating mechanism therefor connected at the ends of the gage, and a locking device to hold the gage in its adjusted position located centrally between the ends of the gage, substantially as described.

5. In combination, the knife, the bed, the gage, the operating and guiding mechanism therefor detachably connected to the ends of the gage, and the locking device arranged centrally between the detachable operating mechanism, substantially as described.

6. In combination, the bed, the knife, the gage, the said bed having vertically-adjustable sections, and the gage having its front lower edge cut away to permit the adjustment of said sections, substantially as described.

7. In combination, the bed having vertically-adjustable sections, the knife, the gage having its lower edge cut away to one side of the center, the said central portion extending to the bed and affording a bearing for the material, substantially as described.

8. In combination, the bed having vertically-adjustable sections, the knife, the gage having its lower edge cut away, and the inserted center-piece extending from top to bottom across said cut-away part, the said piece being grooved vertically, substantially as described.

9. In combination, the bed, the knife and gage, the grooved piece J, inserted in the gage to receive the edge of the knife, said piece being adjustable, and the adjusting-screw therefor, substantially as described.

In testimony whereof I have signed my name to this specification in the presence of two subscribing witnesses.

WILLIAM R. FOX.

Witnesses:
GEO. G. WHITWORTH,
THOS. F. ROOD.